United States Patent [19]
Garncarz et al.

[11] Patent Number: 5,640,676
[45] Date of Patent: Jun. 17, 1997

[54] METHOD FOR GENERATING A HANDOFF CANDIDATE LIST

[75] Inventors: Jeffrey Robert Garncarz, Carol Stream; Timothy J. Gallagher, Glen Ellyn; Brent Lane Goldstein, Palatine, all of Ill.

[73] Assignee: Motorola, Inc., Schaumburg, Ill.

[21] Appl. No.: 439,149

[22] Filed: May 11, 1995

[51] Int. Cl.$^6$ ............................................. H04Q 7/38
[52] U.S. Cl. ............................. 455/33.2; 455/56.1
[58] Field of Search ..................... 455/33.1, 33.2, 455/33.4, 33.3, 56.1, 54.1, 63, 67.1, 67.3; 379/60, 59

[56] References Cited

U.S. PATENT DOCUMENTS

| | | | |
|---|---|---|---|
| 3,636,641 | 1/1972 | Daskam | 455/67.1 |
| 4,475,010 | 10/1984 | Huensch et al. | 455/33.3 |
| 4,670,899 | 6/1987 | Brody et al. | 455/33.4 |
| 4,718,081 | 1/1988 | Brenig | 455/33.3 |
| 5,327,575 | 7/1994 | Menich et al. | 455/33.2 |
| 5,396,647 | 3/1995 | Thompson et al. | 455/56.1 |
| 5,428,816 | 6/1995 | Barnett et al. | 455/33.2 |
| 5,432,843 | 7/1995 | Bonta | 455/33.2 |
| 5,465,389 | 11/1995 | Agrawal et al. | 455/56.1 |
| 5,509,051 | 4/1996 | Barnett et al. | 379/60 |
| 5,517,675 | 5/1996 | O'Connor et al. | 455/33.2 |

*Primary Examiner*—Edward F. Urban
*Assistant Examiner*—Nguyen Vo
*Attorney, Agent, or Firm*—Raymond J. Warren

[57] ABSTRACT

In a cellular communication system (40) a handoff candidate list is generated for a source sector (51) by eliminating (12) from a list of potential handoff candidates (52–56) any sectors having an interference parameter exceeding a threshold value. The list is further reduced by determining (21) a handoff radius (60) and eliminating any candidate sectors (52–56) that fall outside the handoff radius (60). Candidate sectors (52–56) that do not have overlapping coverage areas are also eliminated (23). In addition, candidate sectors (52–56) having a relative angle of sight to the source sector (51) that exceeds a maximum angle are also eliminated (24). Finally, the list is reduced (15) to a preset number of candidates dependent upon the interference parameter.

14 Claims, 2 Drawing Sheets

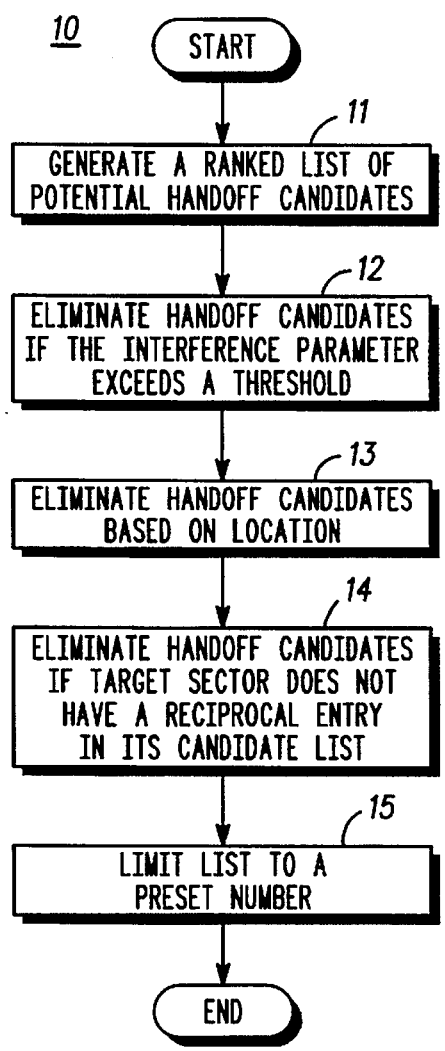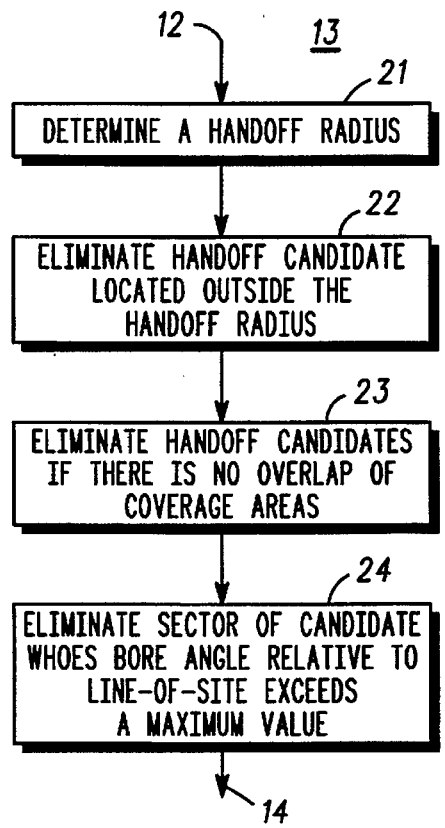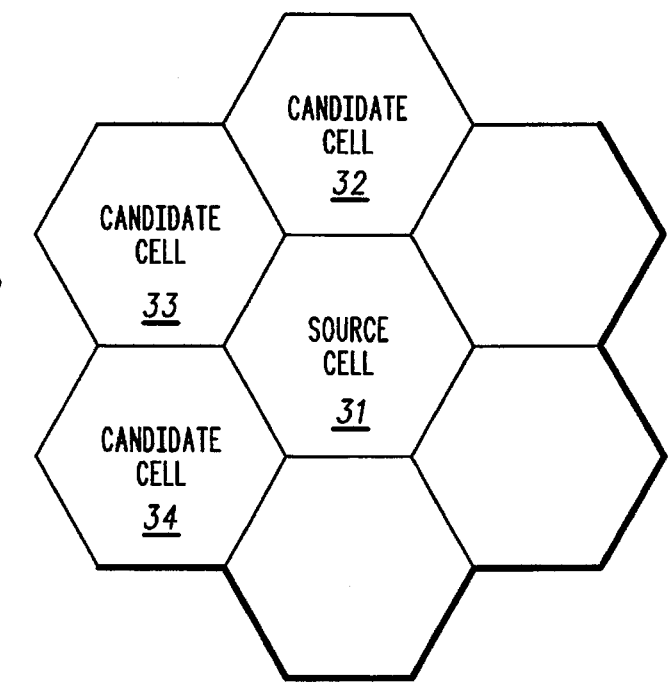

5,640,676

METHOD FOR GENERATING A HANDOFF CANDIDATE LIST

FIELD OF THE INVENTION

The present invention relates, in general, to handoffs in a communication system and, more particularly, to a method for generating a handoff candidate list.

BACKGROUND OF THE INVENTION

A Handoff Candidate List consists of a list of a plurality of cellular base stations (such as cells 32–34 of FIG. 3) to which a mobile transceiver may be handed-off when leaving the service region of the source cell 31. The list of potential handoff candidates for each cell is used by a switch to locate another cell which is better able to serve the mobile.

Generation of the handoff candidate lists for an entire cellular system requires knowledge of how Radio Frequency (RF) propagation from each cell interacts with the propagation of its surrounding cells.

The creation of a handoff candidate list is, in general, a subjective process. Equally skilled engineers, given the same set of input parameters, would be unlikely to produce identical handoff candidate lists. A common methodology involves producing a best server map which indicates the primary coverage regions of each cell, and designating handoffs between cells whose coverage regions share a border (e.g. cells 31 and 33). Potential candidates are eliminated by visual inspection when the line-of-sight path between the source and target cell site is obstructed or when that path crosses through a significant portion of a third cell site. This manual process is time consuming and is prone to error, especially when a large number of cell sites are involved.

When determining which cells are preferred handoff candidate cells, distance and direction are important factors to consider. But distance and direction alone are not always sufficient criteria. This is because the terrain (buildings, trees, etc.) affects how the signals travel so that the signal strength at the same distance from a cell varies with the direction. Therefore, it is important to determine how the terrain affects the propagation.

For the purposes of this description, the terms "relative signal strength" and "signal-to-noise value" are used interchangeably, although more precisely, the relative signal strength values represent potential signal-to-noise, since the transmitting frequency is not taken into consideration. A signal-to-noise matrix is developed to represent how much the signal from one cell would interfere with the signal from another cell if the two cells were to transmit on the same frequency. A low signal-to-noise value tends to indicate cells which are transmitting in close "RF proximity" and as such, are likely to require the ability to handoff to one another.

The signal-to-noise matrix is actually based on the relative amount of area which is common to the serving areas of both cells. The serving area of a cell is the region where a mobile would be serviced by the cell, or sector of a cell in a sectorized design. This is defined by a set of all the points where a signal from the serving cell has the strongest signal strength compared to all other cells transmitting signals. This attempts to model what occurs when a mobile is "handed off" from one cell to another cell. When the signal strength from another cell becomes stronger than the signal strength from the cell to which the mobile is currently linked, the mobile is "handed off" to the cell providing the stronger signal.

In actuality, a handoff does not occur when a signal is detected from another cell which is just slightly stronger than the current signal. This would cause a hysteresis effect where the mobile is constantly oscillating between two cells with similar signal strength values. This problem is overcome differently in analog and digital systems. In an analog system, a handoff occurs when the current signal drops below some predetermined minimum threshold. In a digital system, the handoff occurs when another signal is detected which is stronger than the current signal by some predetermined threshold.

The signal-to-noise matrix is computed by averaging the signal-to-noise values between a source cell 31 and a target cell 33 for all points where the source cell is a potential server. This is accomplished by comparing the signal strength from the source cell 33 to that of all other cells 32–34 in the cellular system 30. If the source cell 31 has the best signal strength at that point, then it is considered to be the serving cell. If it falls below the best signal strength, then it is not considered the serving cell and a handoff to another cell will occur. In reality, the signal strength must fall below a minimum threshold in the analog case, and below a relative threshold to other carriers in the digital case. So when deciding if the source cell 31 is still the carrier we apply either or both of these criteria. If the signal strength falls below a minimum value, or if it falls outside of a range below the best signal strength, then it is not the carrier at that point and the signal-to-noise (S/N) ratio is not computed.

The method to generate the relative signal-to-noise matrix can be described as follows: for every possible pairing of one cell to another in the cellular system, compare the signal strength at every point common to both cell's propagation regions against the best signal strength at that point for all cells in the system. If the source cell's signal strength at a point is greater than some minimum value and is greater than or equal to the best signal strength at that point less some threshold value, compute the signal-to-noise value at this point. The average of all the signal-to-noise values computed for a source and target cell pair is the signal-to-noise value for that pair.

BRIEF DESCRIPTION OF THE DRAWINGS

FIGS. 1 and 2 are flow charts of a process embodying the present invention;

FIG. 3 is a diagram of a communication system; and

DETAILED DESCRIPTION OF THE DRAWINGS

Figure 4:
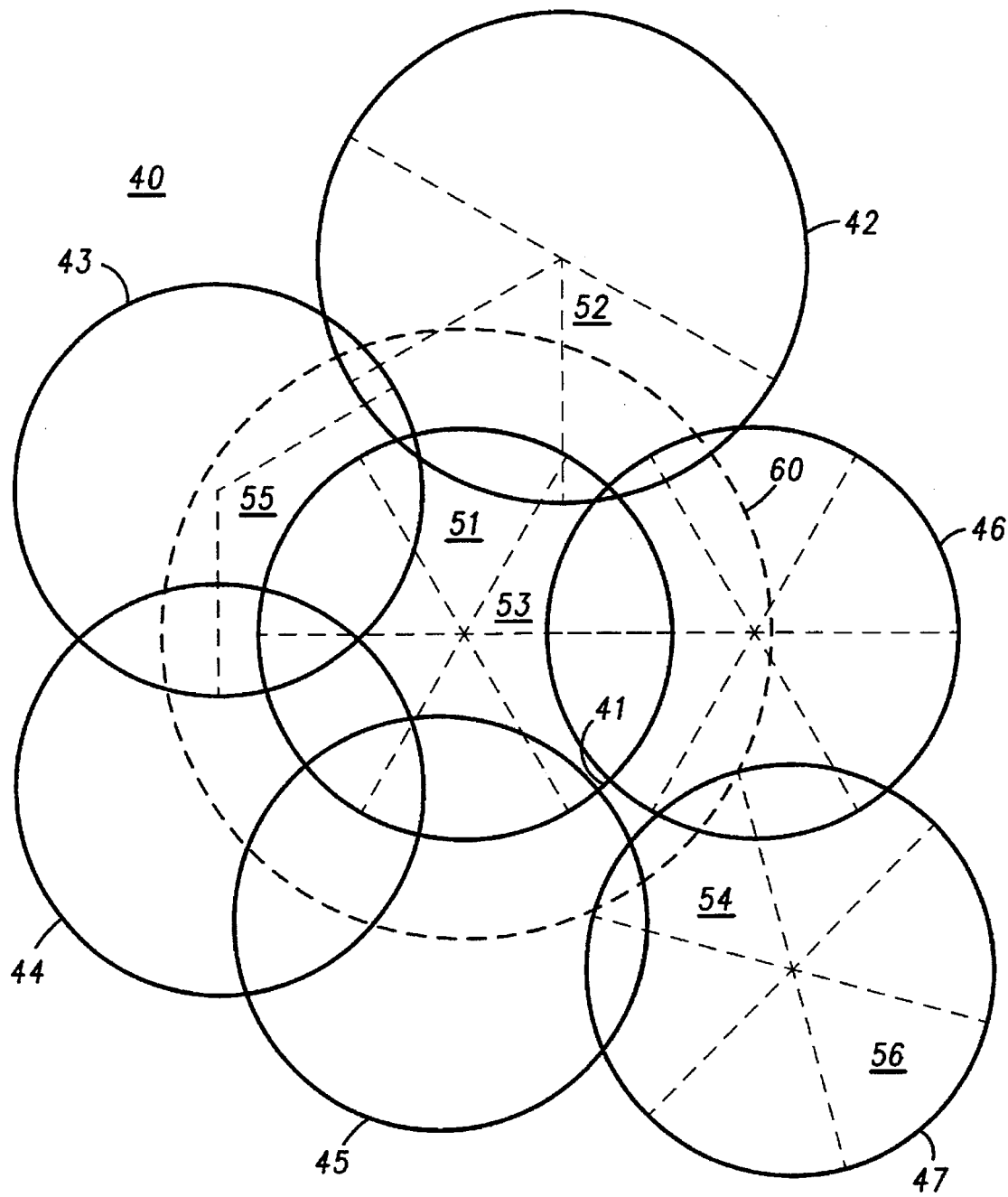
FIG. 4 is a diagram of a communication system utilizing the process of FIGS. 1 and 2.

The present invention is implemented in the context of a method used to predict signal attenuation based on elevation and terrain data; and to produce a matrix of the relative signal strengths between each cell and every other cell in the cellular system.

In the initial step of the handoff candidate generation process, every possible pairing of two cells is evaluated. Each pair of cells is ranked based on their relative "RF proximity" to one another. Cells which are strong RF interferers of a given cell, by definition, have coverage areas which overlap. The degree to which a cell's coverage area overlaps that of another cell is the first criterion used in determining whether a handoff may be required between the cells.

Referring initially to FIG. 1, a flow chart, generally designated 10, illustrating a method for generating a handoff candidate list is presented. In step 11, all potential handoff pairs are ranked based on a signal-to-noise matrix. An example of a signal-to-noise matrix, developed using cells 31–34 of FIG. 3, is illustrated in Table 1, below.

TABLE 1

SIGNAL-TO-NOISE MATRIX

| Source Cell # | Target Cell # | Signal-to-Noise Value |
|---|---|---|
| 31 | 32 | 9 |
| 31 | 34 | 15 |
| 31 | 33 | 24 |
| 32 | 31 | 11 |
| 32 | 33 | 15 |
| 32 | 34 | 26 |
| 33 | 34 | 26 |
| 33 | 32 | 17 |
| 33 | 31 | 25 |
| 34 | 33 | 7 |
| 34 | 32 | 19 |
| 34 | 31 | 26 |

The matrix consists of a plurality of values representing the relative signal strength of each possible carrier/interferer pair, thus the matrix contains n(n−1) values, where n is the number of cells being considered. For this example, we are considering 4 cells and the matrix contains 12 values. For each carrier, or source cell 31, the set of signal-to-noise values representing the relative interference produced by each of the other cells (n−1 values) are ranked from lowest to highest magnitude: where low values indicate interferer signal strength nearly equal to the carrier signal strength (i.e., strong RF proximity); and higher values indicate interferer signal strength less than the carrier signal strength (i.e., weak RF proximity).

Returning now to FIG. 1, once the ranked list of potential handoff candidates is generated, step 11, cells having interference parameters (such as signal-to-noise values) within a predetermined threshold value—and deemed to be within a maximum RF proximity—are included as potential handoff candidates, step 12. Alternatively, handoff candidates having an interference parameter above a maximum value may be eliminated from the handoff candidate list. Next, in step 13, certain handoff candidates may be eliminated based upon physical location of the candidate cell. Candidates which are located a distance from the source cell which exceeds a maximum distance or whose bore angle direction relative to the line of sight from the source to target exceeds a maximum angle are eliminated from the list. This is described in detail below with regard to FIG. 2.

In some cellular technologies, it is necessary to have bi-directional handoff capability (i.e. the target cell must also specify a handoff to the source cell). For those systems, the handoff list may be reduced by eliminating candidates for which there is no reciprocal handoff, step 14. For example, if a list was generated for source sector 51 of cell 41 of FIG. 4, having sector 52 of cell 42 as a handoff candidate, but the list for sector 52 did not have sector 51 as a handoff candidate, then, sector 52 would be eliminated as a handoff candidate for sector 51.

In addition, limitations of cellular hardware and software systems make it necessary to restrict the total number of target cells to which a given cell may handoff. In order to comply with these equipment limitations, it may be necessary to further reduce the number of handoff target cells chosen for a given cell. Based on the signal-to-noise rankings computed in step 11, those handoff target cells having the highest signal-to-noise value (weakest RF proximity) are eliminated, until the total number of target cells is equal to a preset number, step 15.

In FIG. 2, a flow chart of subprocess 13 is illustrated. Subprocess 13 begins by computing a handoff radius between the source cell and the candidate cells, step 21. First, the grid coordinates of the cells are used to compute the distance between two cells according to formula (1).

$$d = \sqrt{(x2-x1)^2 + (y2-y1)^2} \quad (1)$$

where X1, Y1 specifies the grid coordinates of the source cell; and

X2, Y2 specifies the grid coordinates of the target cell.

For each source cell, the average distance (D) between the source cell and each of its three nearest neighbor cells is calculated using equation (2), below.

$$D = (d1+d2+d3)/3 \quad (2)$$

The average distance (D) is then multiplied by a predetermined constant to provide the handoff radius (R) in equation (3).

$$R = Dx \quad (3)$$

where x is the predetermined constant.

This handoff radius is represented by dashed circle 60 of FIG. 4. The rationale behind choosing the three neighbors for this purpose is the realization that when a hexagonal grid is overlaid onto the geographical map of a cellular system such that the centers of the hexagons coincide with cell sites (a standard practice in the design and modeling of cellular systems), the sides of each hexagon touch the border of three cells adjacent to any given cell. The average distance of the three nearest neighbors is multiplied by the constant value (1.5 for example) in order to compensate for cell sites located slightly off-grid. The resulting value establishes the maximum distance 60 from a source cell site 41 for which handoff target cells may be located.

Once handoff radius R has been determined, the candidate cells outside the handoff radius, such as cells 42 and 47, are eliminated from the candidate list, step 22. In other words, potential target cells located at a distance greater than the maximum radius 60 computed for a given cell site 41 are eliminated.

The next step in reducing the candidate list is to eliminate any handoff candidates that to do not have an overlapping coverage area, step 23. In FIG. 4, sector 56 of cell 47 would be eliminated since the coverage areas do not overlap.

When directional antennas are deployed at a cell site, the direction that an antenna faces can be used to eliminate handoffs to cells which are outside the antenna's "field of view". In most cases, these candidates will also have a high signal-to-noise value. However, a low signal-to-noise value does not necessarily indicate that the two cells in question face one another. It is desirable to eliminate handoffs between sectors which do not face one another, because the path a mobile transceiver would travel to require such a handoff can contain coverage gaps, or may cross through the coverage area of a third cell (e.g. between cells 41 and 47). The formula for computing the relative (bore) angle (relative to the X axis) between a directional source cell and a potential target cell is:

$$\phi = ATAN((Y2 - Y1)/(X2 - X1))(180/\pi) \quad (4)$$

for $(Y2 - Y1) > 0$;

and $$\phi = ATAN((Y2 - Y1)/(X2 - X1))(180/\pi) + 360 \quad (5)$$

for $(Y2 - Y1) < 0$.

where X1, Y1 specifies the grid coordinates of the source cell;

X2, Y2 specifies the grid coordinates of the candidate target cell; and

ATAN represents the function arc tangent.

If the relative angle, φ, is greater than a maximum value (threshold angle), then the source sector does not face the potential target sector, and the target sector shall be eliminated, step 24. Subprocess 13 then returns to step 14 of process 10. As an example, the angle between sector 51 of cell 41 and sector 52 of cell 52 would be great enough that, even if the signal-to-noise value between the sectors were sufficient, sector 52 would be eliminated from the handoff candidate list of sector 51.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

We claim:

1. A method for generating a handoff candidate list for a source sector comprising the steps of:

generating a ranked list of a plurality of handoff candidates by ranking a plurality of potential handoff sectors in order of an interference parameter;

eliminating a candidate of said plurality of handoff candidates from said ranked list based on physical location in relation to said source sector; and eliminating a target sector of said plurality of handoff candidates from said ranked list of said source sector unless said source sector is present on a handoff candidate list for said target sector, thereby forming said handoff candidate list.

2. The method of claim 1 further comprising the step of eliminating a candidate of said plurality of handoff candidates from said ranked list for which said interference parameter exceeds a threshold interference parameter.

3. The method of claim 1 wherein said step of forming said handoff candidate list comprises the steps of:

determining a handoff radius; and eliminating a candidate of said plurality of handoff candidates from said ranked list which falls outside said handoff radius.

4. The method of claim 1 wherein said step of eliminating said candidate of said plurality of handoff candidates comprises the step of eliminating a target sector from said ranked list unless said target sector has a coverage area which overlaps a coverage area of said source sector.

5. The method of claim 1 further comprising the step of selecting a preset number of said plurality of handoff candidates which remain on said ranked list.

6. The method of claim 1 wherein said interference parameter comprises a carrier-to-interference ratio.

7. The method of claim 1 wherein said interference parameter comprises a relative signal strength.

8. The method of claim 1 further comprising the step of eliminating a target sector of said plurality of handoff candidates from said ranked list of said source sector if a relative angle between said source sector and said target sector exceeds a maximum value.

9. A method for generating a handoff candidate list for a source sector comprising the steps of:

generating a ranked list of a plurality of handoff candidates by ranking a plurality of potential handoff sectors in order of an interference parameter;

computing a handoff radius;

eliminating a candidate of said plurality of handoff candidates from said ranked list which falls outside said handoff radius;

eliminating a target sector from said ranked list unless said target sector has a coverage area which overlaps a coverage area of said source sector;

eliminating a target sector of said plurality of handoff candidates from said ranked list of said source sector unless said source sector is present on a handoff candidate list for said target sector, thereby forming said handoff candidate list.

10. The method of claim 9 further comprising the step of eliminating a candidate of said plurality of handoff candidates from said ranked list for which said interference parameter exceeds a threshold interference parameter.

11. The method of claim 9 further comprising the step of selecting a preset number of said plurality of handoff candidates which remain on said ranked list.

12. The method of claim 9 wherein said interference parameter comprises a carrier-to-interference ratio.

13. The method of claim 9 wherein said interference parameter comprises a relative signal strength.

14. The method of claim 9 further comprising the step of eliminating a target sector of said plurality of handoff candidates from said ranked list of said source sector if a relative angle between said source sector and said target sector exceeds a maximum value.

* * * * *